United States Patent
Tachibana

(10) Patent No.: US 10,319,226 B2
(45) Date of Patent: Jun. 11, 2019

(54) VEHICLE CONTROL DEVICE

(71) Applicant: TOYOTA JIDOSHA KABUSHIKI KAISHA, Toyota-shi, Aichi-ken (JP)

(72) Inventor: Akihide Tachibana, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/896,308

(22) Filed: Feb. 14, 2018

(65) Prior Publication Data
US 2018/0233034 A1 Aug. 16, 2018

(30) Foreign Application Priority Data
Feb. 16, 2017 (JP) .................. 2017-027151

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2019.01) | |
| G08G 1/017 | (2006.01) | |

(Continued)

(52) U.S. Cl.
CPC .............. *G08G 1/017* (2013.01); *B60W 30/08* (2013.01); *B60W 30/165* (2013.01); *G01S 7/003* (2013.01); *G01S 13/66* (2013.01); *G01S 13/931* (2013.01); *G01S 17/66* (2013.01); *G01S 17/936* (2013.01); *G06K 9/00791* (2013.01); *G08G 1/048* (2013.01); *G08G 1/052* (2013.01); *G08G 1/163* (2013.01); *G08G 1/166* (2013.01); *G01S 13/726* (2013.01); *G01S 2013/936* (2013.01); *G01S 2013/9353* (2013.01); *G01S 2013/9367* (2013.01)

(58) Field of Classification Search
CPC ........ G08G 1/017; G08G 1/048; G08G 1/052; G08G 1/163; G08G 1/166; G08G 1/22; G06F 17/18
USPC ....................... 701/1, 93; 702/179
See application file for complete search history.

(56) References Cited

U.S. PATENT DOCUMENTS

2005/0159875 A1* 7/2005 Chia .................. B60K 31/0008
701/93
2015/0178247 A1* 6/2015 Kinoshita ............. G08G 1/017
702/179

(Continued)

FOREIGN PATENT DOCUMENTS

JP 2013-228804 A 11/2013

*Primary Examiner* — Mahmoud S Ismail
(74) *Attorney, Agent, or Firm* — Sughrue Mion, PLLC

(57) ABSTRACT

A vehicle control device includes at least one electronic control unit configured to acquire communication information from a surrounding vehicle, acquire a detection result of the traveling state of the surrounding vehicle, identify the surrounding vehicle as a particular vehicle, determine a link state between the surrounding vehicle and the host vehicle as a regular link while the surrounding vehicle is identified as the particular vehicle, identify the particular vehicle as a target vehicle, determine the link state between a lost vehicle and the host vehicle as a temporary link, the lost state being a state in which the target vehicle is not detected by the sensor, recognize the lost vehicle the link state of which has been changed from the regular link to the temporary link as the target vehicle while the link state is the temporary link, and control traveling of the host vehicle.

6 Claims, 11 Drawing Sheets

(51) Int. Cl.
> *G08G 1/16* (2006.01)
> *G08G 1/048* (2006.01)
> *G08G 1/052* (2006.01)
> *B60W 30/08* (2012.01)
> *B60W 30/165* (2012.01)
> *G01S 13/93* (2006.01)
> *G06K 9/00* (2006.01)
> *G01S 17/66* (2006.01)
> *G01S 17/93* (2006.01)
> *G01S 7/00* (2006.01)
> *G01S 13/66* (2006.01)
> *B60T 8/32* (2006.01)
> *G06F 17/18* (2006.01)
> *G06F 19/00* (2018.01)
> *G01S 13/72* (2006.01)

(56) References Cited

U.S. PATENT DOCUMENTS

2017/0249848 A1\* 8/2017 Niino ................ B60W 30/17
2018/0186283 A1\* 7/2018 Fischer ................ B60Q 1/46

\* cited by examiner

FIG. 3

| SURROUNDING VEHICLE N | TRAVELING STATE (INTER-VEHICLE COMMUNICATION) | TRAVELING STATE (SENSOR DETECTION RESULT) | LINK STATE |
|---|---|---|---|
| FIRST VEHICLE N1 | POSITION: (XA, YA)<br>SPEED: VA | POSITION: (XA, YA)<br>SPEED: VA | REGULAR LINK |
| SECOND VEHICLE N2 | POSITION: (XB, YB)<br>SPEED: VB | POSITION: No DATA<br>SPEED: No DATA | NO LINK |
| THIRD VEHICLE N3 | POSITION: No DATA<br>SPEED: No DATA | POSITION: (XC, YC)<br>SPEED: VC | NO LINK |
| FOURTH VEHICLE N4 | POSITION: (XD, YD)<br>SPEED: VD | POSITION: No DATA<br>SPEED: No DATA | TEMPORARY LINK |
| ⋮ | ⋮ | ⋮ | ⋮ |

VEHICLE CONTROL DEVICE

INCORPORATION BY REFERENCE

The disclosure of Japanese Patent Application No. 2017-027151 filed on Feb. 16, 2017 including the specification, drawings and abstract is incorporated herein by reference in its entirety.

BACKGROUND

1. Technical Field

The present disclosure relates to a vehicle control device.

2. Description of Related Art

Japanese Patent Application Publication No. 2013-228804 (JP 2013-228804 A) discloses a device for identifying a preceding vehicle, which travels immediately ahead of the host vehicle, from a plurality of other vehicles traveling near the host vehicle. This device calculates the similarity between the speed (or position) obtained based on the sensor for detecting an object ahead the host vehicle and the speed (or position) of the other vehicle obtained based on the inter-vehicle communication. This device identifies one of the other vehicles with high similarity as the preceding vehicle.

SUMMARY

In some cases, when there is an obstacle, such as a parked vehicle or a bicycle, on the road shoulder of a lane in which a target vehicle such as the preceding vehicle is traveling, the target vehicle temporarily moves to a position near to the lane boundary line in order to travel with a distance from the obstacle. When the target vehicle moves in the lateral direction of the lane, there is a possibility that the sensor of the host vehicle will lose the target vehicle. For this reason, the device described in Japanese Patent Application Publication No. 2013-228804 (JP 2013-228804 A) sometimes loses a target vehicle that travels with a distance from an obstacle, meaning that it is necessary to recognize the target vehicle again after the target vehicle returns to the lane center. Therefore, one of the problems with this device is that, while the target vehicle is lost and until the target vehicle is recognized again, assistance or processing based on the target vehicle (for example, preceding vehicle following assistance, vehicle group forming processing, and so on) cannot be performed. The present disclosure provides a device that can continuously recognize a target vehicle even when the on-vehicle sensor has lost the target vehicle.

An aspect provides a vehicle control device. The vehicle control device according to the aspect includes at least one electronic control unit configured to acquire communication information from a surrounding vehicle presenting around a host vehicle via inter-vehicle communication, the communication information including a traveling state of the surrounding vehicle, acquire a detection result of the traveling state of the surrounding vehicle from a sensor mounted on the host vehicle, identify the surrounding vehicle as a particular vehicle by comparing the traveling state included in the communication information and the detection result of the traveling state, the surrounding vehicle having sent the communication information, determine a link state between the surrounding vehicle and the host vehicle as a regular link while the surrounding vehicle is identified as the particular vehicle, identify the particular vehicle as a target vehicle, determine the link state between a lost vehicle and the host vehicle as a temporary link, from a time at which the sensor detects a start of a lost state to a time at which a predetermined termination condition is satisfied, the lost vehicle being a vehicle the link state of which is no longer the regular link because of the lost state, the lost state being a state in which the target vehicle is not detected by the sensor, continuously recognize the lost vehicle the link state of which has been changed from the regular link to the temporary link as the target vehicle while the link state is the temporary link, and control traveling of the host vehicle based on a traveling state of the target vehicle.

This device uses the state determination unit to determine the link state between the surrounding vehicle that sent the communication information and the vehicle as the regular link. The surrounding vehicle in the regular link state is recognized by the recognition unit as the target vehicle. On the other hand, when the surrounding vehicle recognized as the target vehicle is lost by the on-vehicle sensor, the link state between the surrounding vehicle, recognized as the target vehicle, and the vehicle is determined by the state determination unit determines as the temporary link from the time the on-vehicle sensor loses the surrounding vehicle to the time the predetermined termination condition is satisfied. After that, the surrounding vehicle in the temporary link state is continuously recognized by the recognition unit as the target vehicle. In this way, by providing the temporary link as one of the link states between the surrounding vehicle and the vehicle, this device can continuously recognize the surrounding vehicle as the target vehicle until the predetermined termination condition is satisfied even if the on-vehicle sensor loses the surrounding vehicle that has been recognized as the target vehicle.

In the aspect, the predetermined termination condition may be satisfied when a lateral position of the lost vehicle exceeds a predetermined range in a width direction of the host vehicle.

According to the configuration described above, when the lateral position of the surrounding vehicle whose link state is no longer the regular link exceeds the predetermined range, it is estimated that the surrounding vehicle whose link state is no longer the regular link is not a vehicle that has temporarily moved to a position near to the lane boundary line. Therefore, this device terminates the temporary link when the lateral position of the surrounding vehicle whose link state is no longer the regular link exceeds the predetermined range, thus excluding a vehicle, such as a vehicle that is going to change the lane, from the target vehicles.

In the aspect, the predetermined termination condition may be satisfied when a predetermined first limit time has elapsed since the start of the lost state of the sensor.

According to the configuration described above, when the surrounding vehicle whose link state is no longer the regular link is not detected even when the first limit time has elapsed, it is estimated that the surrounding vehicle whose link state is no longer the regular link is not a vehicle that has temporarily moved to a position near to the lane boundary line. Therefore, this device terminates the temporary link when the first limit time has elapsed since the on-vehicle sensor lost the surrounding vehicle, thus excluding a vehicle, such as a vehicle that is going to change the lane, from the target vehicles.

In the aspect, the at least one electronic control unit may be configured to, when the lost vehicle is re-detected by the sensor, determine the link state between the lost vehicle re-detected by the sensor and the host vehicle as the regular link.

According to the configuration described above, this device releases the predetermined termination condition that terminates the recognition of the target vehicle by changing the link state between the vehicle and the surrounding vehicle from the temporary link to the regular link.

In the aspect, the surrounding vehicle may travel ahead of or behind the host vehicle in a lane in which the host vehicle travels, and the at least one electronic control unit may be configured to determine whether the lost vehicle has begun to travel toward a center of the lane based on a change in the lateral position of the lost vehicle and may determine, when the lost vehicle is re-detected by the sensor from a time at which the at least one electronic control unit determines that the lost vehicle has begun to travel toward the center of the lane to a time at which a predetermined second limit time elapses, the link state between the lost vehicle re-detected by the sensor and the host vehicle as the regular link.

When the surrounding vehicle in the temporary link state begins to travel toward the center of the lane, it is estimated that the surrounding vehicle in the temporary link state has temporarily moved to a position near to the lane boundary line. Therefore, when the on-vehicle sensor re-detects the surrounding vehicle in the temporary link state within the second limit time, the surrounding vehicle that has temporarily moved to a position near to the lane boundary line can be continuously recognized by changing the link state between the surrounding vehicle and the vehicle from the temporary link to the regular link.

In the aspect, the traveling state of the surrounding vehicle may include at least one of a speed of the surrounding vehicle and a position of the surrounding vehicle.

In the aspect, when the host vehicle has the temporary link with the surrounding vehicle, the traveling state of the surrounding vehicle may be acquired by the host vehicle from the surrounding vehicle via the inter-vehicle communication and the surrounding vehicle may not be detected by the sensor, and when the host vehicle has the regular link with the surrounding vehicle, the traveling state of the surrounding vehicle may be acquired by the host vehicle from the surrounding vehicle via the inter-vehicle communication and the surrounding vehicle may be detected by the sensor.

According to one aspect or the embodiments of the present disclosure, a target vehicle can be continuously recognized even if the on-vehicle sensor has lost the target vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing the link state of surrounding vehicles;

DETAILED DESCRIPTION OF EMBODIMENTS

Figure 1:
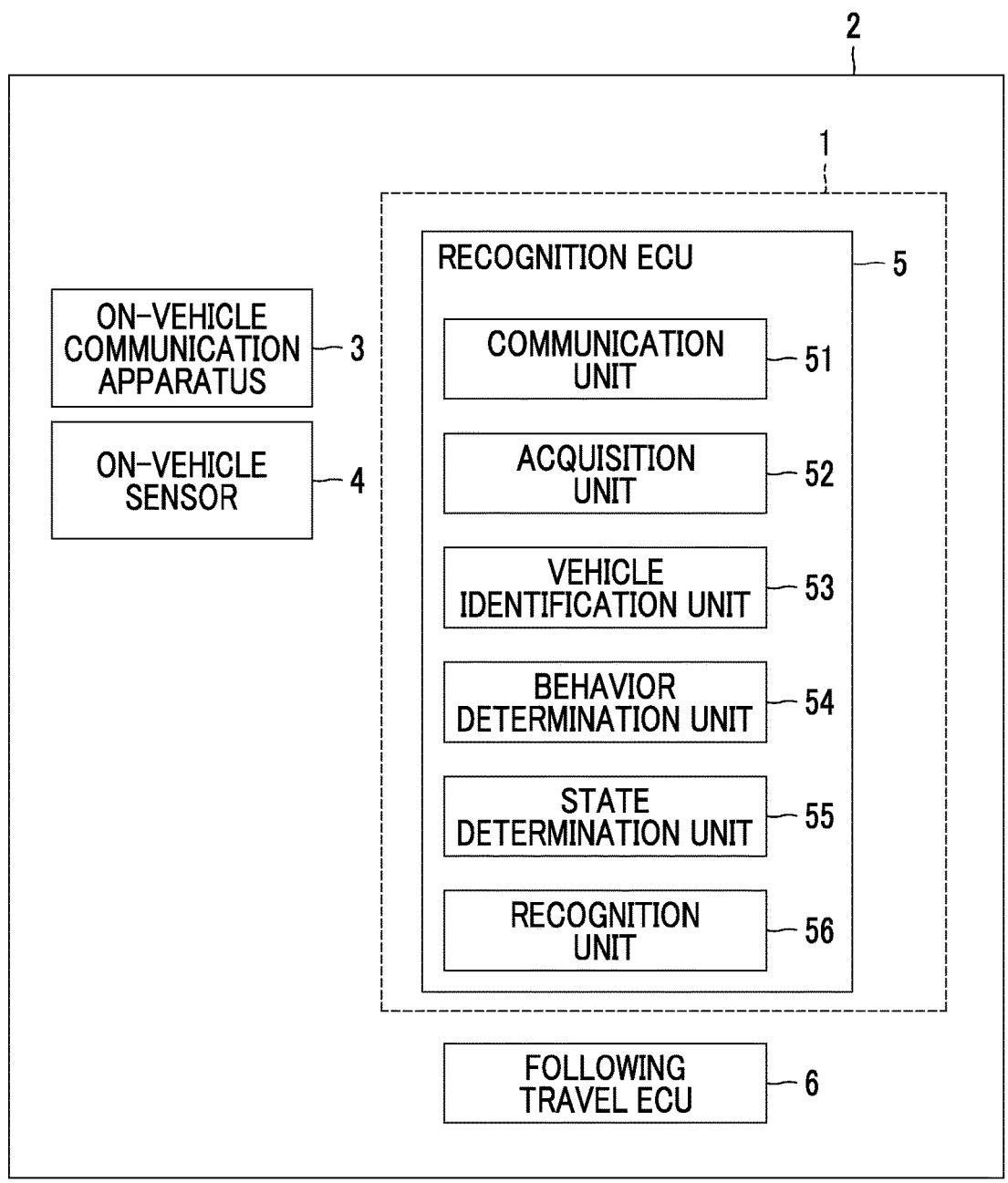
FIG. 1 is a block diagram showing a configuration of a vehicle that includes a vehicle recognition device according to an embodiment.

Embodiments of the present disclosure will be described in detail below with reference to the drawings. In the description below, the same reference numeral is used for the same or equivalent component and the duplicated description is omitted.

[Configuration of Vehicle Recognition Device]

FIG. 1 is a block diagram showing a configuration of a vehicle 2 that includes a vehicle recognition device 1 according to an embodiment. As shown in FIG. 1, the vehicle recognition device 1 is mounted on the vehicle 2 such as a passenger car. The vehicle recognition device 1 recognizes a target vehicle from the surrounding vehicles around the vehicle 2 based on the result of inter-vehicle communication and the detection result of the on-vehicle sensor. Surrounding vehicles are, for example, vehicles that are present in the detection range of the on-vehicle sensor of the vehicle 2. Surrounding vehicles may be a vehicle traveling ahead of or behind the vehicle 2 in the same lane in which the vehicle 2 travels.

The target vehicle refers to a vehicle to be processed by predetermined control processing. The predetermined control processing is performed in the vehicle 2 or in a system outside the vehicle 2. A specific example of the predetermined control processing is control processing for following a preceding vehicle. The preceding vehicle is a vehicle traveling ahead of the vehicle 2, for example, a vehicle traveling immediately ahead of the vehicle 2 in the traveling lane of the vehicle 2. In the vehicle following processing, the acceleration/deceleration information on the preceding vehicle is acquired via inter-vehicle communication for use in controlling the traveling of the vehicle 2 so that the vehicle 2 can follow the preceding vehicle at a predetermined inter-vehicle distance. The predetermined control processing may be vehicle group forming processing or signal control processing. The vehicle group forming processing is the processing in which the vehicle and at least one of the preceding vehicle and the following vehicle are recognized as one group (vehicle group). The following vehicle is a vehicle traveling behind the vehicle 2, for example, a vehicle traveling immediately after the vehicle 2 in the traveling lane of the vehicle 2. The signal control processing is the processing in which the vehicles of a vehicle group pass through a predetermined position where a traffic light is installed while the traffic light is green.

An example in which the vehicle recognition device 1 is used for the preceding-vehicle following control will be described below. In this example, the predetermined control processing is the vehicle following processing, and the target vehicle is a preceding vehicle to be processed by the vehicle following processing.

The vehicle recognition device 1 includes an on-vehicle communication apparatus 3, an on-vehicle sensor 4, and Electronic Control Units (ECUs). An ECU is an electronic control unit having a Central Processing Unit (CPU), a Read Only Memory (ROM), a Random Access Memory (RAM), and a Controller Area Network (CAN). The vehicle recognition device 1 includes a recognition ECU 5 and a following travel ECU 6 as the ECUs.

The on-vehicle communication apparatus 3 is a communication apparatus that performs inter-vehicle communication. The on-vehicle communication apparatus 3 receives communication information sent by the surrounding vehicles via inter-vehicle communication. The communication information includes the traveling state of the surrounding vehicles. The traveling state includes at least one of the speed and the position of a surrounding vehicle that sent the communication information.

The on-vehicle sensor 4 is a detection apparatus that detects objects around the vehicle 2. The objects include moving objects such as pedestrians, bicycles, other vehicles, and stationary objects such as guardrails and buildings. More specifically, the on-vehicle sensor 4 included in the vehicle recognition device 1 detects the traveling state of the preceding vehicle. The traveling state, which is a numerical representation of the movement of a vehicle, includes at least one of the speed and the position of the vehicle. An example of the on-vehicle sensor 4 is a radar sensor. The radar sensor is a detection apparatus that detects an object around the vehicle 2 using radio waves (for example, millimeter waves) or light. For example, the radar sensor includes a millimeter wave radar or a LIDAR (LIDAR: Laser Imaging Detection and Ranging). The radar sensor detects an object by sending radio waves or light to the surroundings of the vehicle 2 and by receiving radio waves or light reflected by the object. To detect the preceding vehicle, the radar sensor sends radio waves or light toward the area ahead of the vehicle 2.

Figure 2:
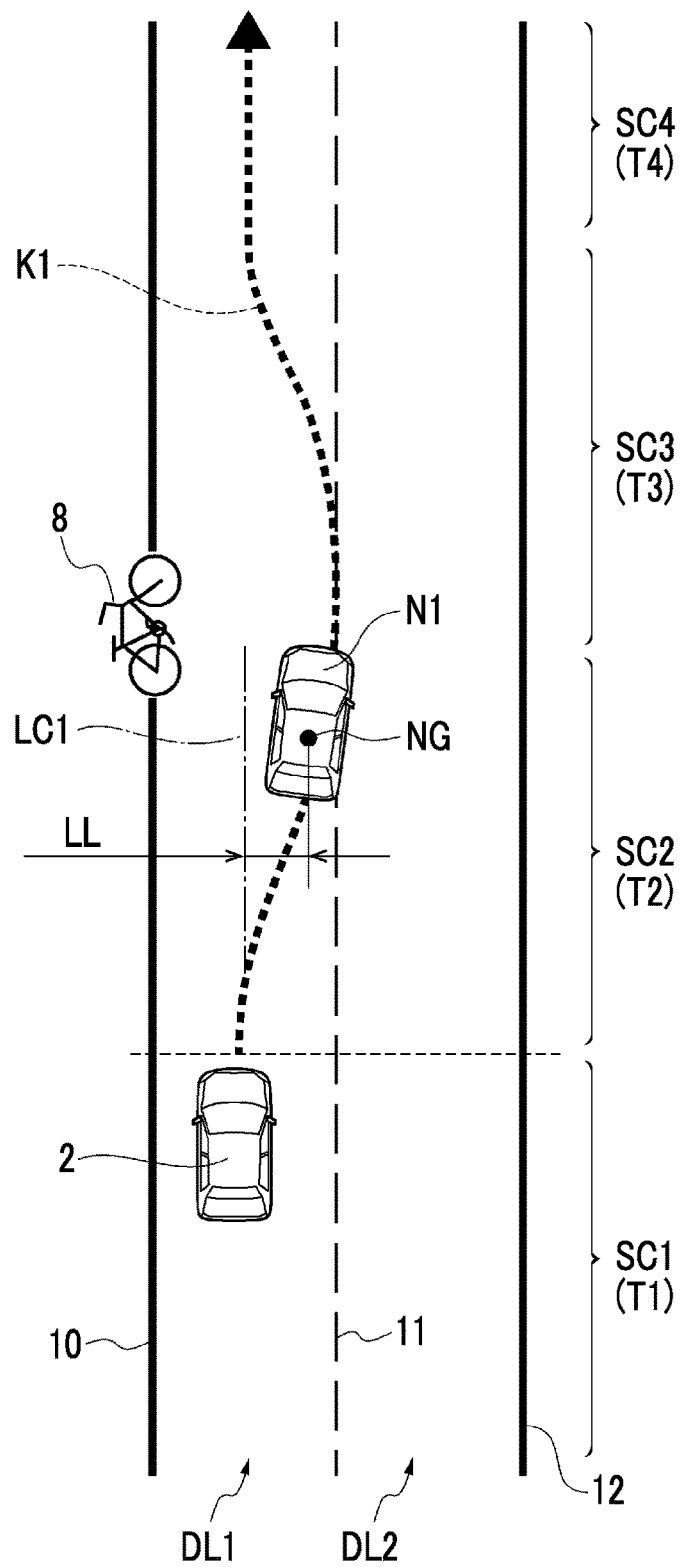
FIG. 2 is a diagram showing an example of a scene in which an on-vehicle sensor loses a preceding vehicle.

The on-vehicle sensor 4, which detects a preceding vehicle based on the reflection from the preceding vehicle, may lose the preceding vehicle when it moves in the lateral direction. Losing a detection target means that the detection target becomes undetected. FIG. 2 is a diagram showing an example of a scene in which the on-vehicle sensor loses a preceding vehicle. In the scene shown in FIG. 2, the vehicle 2 is traveling on a road. The road includes a first traveling lane DL1, partitioned by lane boundary lines 10 and 11, and a second traveling lane DL2 partitioned by lane boundary lines 11 and 12. In the first traveling lane DL1 in which the vehicle 2 is traveling, the preceding vehicle N1 is traveling ahead of the vehicle 2. The vehicle 2 is traveling along the lane center LC1 of the first traveling lane DL1, and the on-vehicle sensor 4 of the vehicle 2 is sending radio waves or light toward the lane center LC1. Therefore, while the preceding vehicle N1 travels along the lane center LC1, the on-vehicle sensor 4 of the vehicle 2 can detect the preceding vehicle N1.

On the other hand, when an object 8 such as a bicycle is present on the road shoulder of the first traveling lane DL1, the preceding vehicle N1 travels with a predetermined distance from the object 8 (as indicated by the traveling trajectory K1). In this case, the traveling position of the preceding vehicle N1 (more specifically, the center of gravity position NG) is temporarily offset from the lane center LC1 to the lateral direction of the first traveling lane DL1. As indicated by the traveling trajectory K1, the preceding vehicle N1 does not completely move laterally into the second traveling lane DL2 which is the adjacent lane, but passes the object 8 while traveling within the first traveling lane DL1 and a range in which the preceding vehicle N1 runs off the first traveling lane DL1 by a predetermined distance. In this embodiment, such passing is defined as "simple passing" in order to distinguish it from ordinary passing or a lane change. When the preceding vehicle N1 performs simple passing, the on-vehicle sensor 4 loses the preceding vehicle N1 that has moved in the lateral direction. After that, when the preceding vehicle N1 returns to the lane center LC1, the on-vehicle sensor 4 re-detects the preceding vehicle N1.

In FIG. 2, the traveling section in which the preceding vehicle N1 travels straight along the lane center LC1 is indicated by the first traveling section SC1, the traveling section from the time the preceding vehicle N1 begins to move in the lateral direction to the time the preceding vehicle N1 returns to the lane center LC1 is indicated by the second traveling section SC2 and the third traveling section SC3, and the traveling section in which the preceding vehicle N1 travels straight along the lane center LC1 again is indicated by the fourth traveling section SC4. The traveling sections SC may be expressed in terms of traveling times (T1 to T4). The on-vehicle sensor 4 can detect the preceding vehicle N1 in the first traveling section SC1 and loses the preceding vehicle N1 immediately after the start of the second traveling section SC2. After that, the preceding vehicle N1 is re-detected in the fourth traveling section SC4. While the preceding vehicle N1 is lost and before the preceding vehicle N1 is re-detected, the following control based on the preceding vehicle N1 cannot be performed. Therefore, as will be described later, the vehicle recognition device 1 operates in this embodiment in such a way that the preceding vehicle N1 can be recognized as the preceding vehicle to be followed even when the on-vehicle sensor 4 loses the preceding vehicle N1 that performs simple passing.

The recognition ECU 5 is connected to a network that communicates via the CAN communication circuit so that the recognition ECU 5 can communicate with the components of the vehicle 2 described above. For example, based on the signal output from the CPU, the recognition ECU 5 sends or receives data by operating the CAN communication circuit, stores the received data in the RAM, loads the program stored in the ROM into the RAM, and executes the program loaded in the RAM. By doing so, the recognition ECU 5 realizes the function of the components of the recognition ECU 5 that will be described below. The recognition ECU 5 may be configured by a plurality of electronic control units.

The recognition ECU 5 recognizes the preceding vehicle N1 from the surrounding vehicles that are present around the vehicle 2. The recognition ECU 5 includes a communication unit 51, an acquisition unit 52, a vehicle identification unit 53, a behavior determination unit 54, a state determination unit 55, and a recognition unit 56.

The communication unit 51 acquires the communication information, which includes the traveling state of surrounding vehicles, from the surrounding vehicles via inter-vehicle communication. The communication unit 51 acquires at least one of the position and the speed of the surrounding vehicles based on the communication information received by the on-vehicle communication apparatus 3.

The acquisition unit 52 acquires the detection result of the traveling state of the preceding vehicle N1 from the on-vehicle sensor 4 of the vehicle 2. The acquisition unit 52 acquires at least one of the position and the speed of the preceding vehicle N1 detected by the on-vehicle sensor 4 of the vehicle 2. The acquisition unit 52 is only required to acquire data for use in comparison with the information on the surrounding vehicles acquired by the communication unit 51 via inter-vehicle communication. That is, when the communication unit 51 acquires the positions of surrounding vehicles, the acquisition unit 52 acquires at least the position of the preceding vehicle N1. Similarly, when the communication unit 51 acquires the speed of the surrounding vehicles, the acquisition unit 52 acquires at least the speed of the preceding vehicle N1. When the communication unit 51 acquires both the position and speed of the surrounding vehicles, the acquisition unit 52 obtains at least one of the position and speed of the preceding vehicle N1.

The vehicle identification unit 53 compares the traveling state, included in the communication information acquired by the communication unit 51, and the detection result of the traveling state acquired by the acquisition unit 52 to identify a surrounding vehicle (in this case, the preceding vehicle N1) that sent the communication information. To identify a surrounding vehicle is to determine that the surrounding vehicle that sent the communication information via inter-vehicle communication and the surrounding vehicle detected by the on-vehicle sensor 4 of the vehicle 2 are the same vehicle. The vehicle identification unit 53 compares the traveling state, included in the communication information, and the detection result of the traveling state acquired by the acquisition unit 52. For example, the vehicle identification unit 53 compares a temporal change in the vehicle speed (or the vehicle position) of the preceding vehicle N1 at a predetermined time (detection result acquired by the acquisition unit 52) and a temporal change in the vehicle speed (or vehicle position) of the surrounding vehicle with which the inter-vehicle communication is being performed (communication result acquired by the communication unit 51). If the detection result matches the communication result, the vehicle identification unit 53 identifies the preceding vehicle N1.

There is no need for the vehicle identification unit 53 to determine that the comparison result is a perfect match. If the difference between the temporal change in the vehicle speed of the preceding vehicle N1 at a predetermined time and the temporal change in the vehicle speed of a surrounding vehicle with which the inter-vehicle communication is being performed is within a predetermined range, the vehicle identification unit 53 may determine that a match occurs between the detection result and the communication result. The vehicle identification unit 53 may use other methods to identify the preceding vehicle N1. For example, the vehicle identification unit 53 may use a known method to identify the preceding vehicle N1. The vehicle identification unit 53 may calculate a temporal change in the relative distance between the vehicle 2 and a surrounding vehicle and, based on the calculated temporal change in the relative distance, identify the preceding vehicle N1.

The state determination unit 55 determines the link state between the preceding vehicle N1 that sent the communication information and the vehicle 2. The link state represents an electronic connection between two vehicles. The link state includes a regular link, a temporary link, and a no link. The regular link is a state in which the vehicle 2 can identify the preceding vehicle N1 via inter-vehicle communication and sensor detection, and the no link is a state in which the vehicle 2 cannot identify the preceding vehicle N1. The temporary link is a state in which the preceding vehicle N1 that was in the regular link state is no longer in the regular link state. The temporary link indicates that the vehicle 2 can continue inter-vehicle communication with the preceding vehicle N1 but that the vehicle 2 cannot detect the preceding vehicle N1 by the on-vehicle sensor 4.

The state determination unit 55 changes the link state according to whether the vehicle identification unit 53 identifies the preceding vehicle N1. For example, the state determination unit 55 determines the link state as follows. While the preceding vehicle N1 is identified by the vehicle identification unit 53, the state determination unit 55 determines that the link state between the identified preceding vehicle N1 and the vehicle 2 is the regular state. When the on-vehicle sensor 4 loses the preceding vehicle N1 and, as a result, the link state is no longer the regular state, the state determination unit 55 determines that the link state between the preceding vehicle N1 and the vehicle 2 is the temporary state for the period from the time the on-vehicle sensor 4 lost the preceding vehicle N1 to the time a predetermined termination condition is satisfied.

FIG. 3 is a diagram showing the link state of surrounding vehicles. FIG. 3 shows the inter-vehicle communication result between the vehicle 2 and a surrounding vehicle N, the sensor detection result of the on-vehicle sensor 4 of the vehicle 2, and the link state corresponding to the inter-vehicle communication result and the sensor detection result. As shown in FIG. 3, since the position (XA, YA) and the speed VA of the first vehicle N1 are included in both of the inter-vehicle communication result and the sensor detection result, the vehicle identification unit 53 can identify the first vehicle N1. In this case, the state determination unit 55 determines the link state between the first vehicle N1 and the vehicle 2 as the "regular link". Since the position (XC, YC) and the speed VC of the third vehicle N3 are included in the sensor detection result but are not included in the inter-vehicle communication result, the vehicle identification unit 53 cannot identify the third vehicle N3. In this case, the state determination unit 55 determines the link state between the third vehicle N3 and the vehicle 2 as the "no link".

Since the position (XB, YB) and the speed VB of the second vehicle N2 are included in the inter-vehicle communication result but are not included in the sensor detection result, the vehicle identification unit 53 cannot identify the second vehicle N2. Similarly, since the position (XD, YD) and the speed VD of the fourth vehicle N4 are included in the inter-vehicle communication result but are not included in the sensor detection result, the vehicle identification unit 53 cannot identify the fourth vehicle N4. That is, for the fourth vehicle N4, although the presence of the surrounding vehicle is recognized by the inter-vehicle communication result, the on-vehicle sensor 4 loses the fourth vehicle N4. In such a case, the state determination unit 55 determines that the link state is the "temporary link" until a predetermined termination condition is satisfied, on condition that the surrounding vehicle that the on-vehicle sensor 4 lost had been in the regular link state until just before the surrounding vehicle was lost. In the example shown in FIG. 3, the second vehicle N2 is not a vehicle that had been in the regular link state just before it was lost or is a vehicle that had been in the regular link state just before it was lost and the predetermined termination condition was satisfied. In this case, the state determination unit 55 determines the link state of the second vehicle N2 as the "no link". On the other hand, the fourth vehicle N4 is a vehicle that had been in the regular link state just before it was lost and the predetermined termination condition has not yet been satisfied. In this case, the state determination unit 55 determines the link state of the fourth vehicle N4 as the "temporary link".

The state determination unit 55 terminates the temporary link when the predetermined termination condition is satisfied. The termination condition of the temporary link is a condition concerning the lateral position of the preceding vehicle N1 in the temporary link state. For example, the termination condition of the temporary link is satisfied when the lateral position of the preceding vehicle N1 whose the link state is no longer the regular link (the preceding vehicle N1 in the temporary link state) exceeds a temporary link continuation range (an example of the predetermined range). The temporary link continuation range is a range within the lane in which the preceding vehicle N1 travels (first traveling lane DL1) or a range including the first traveling lane DL1 and an area the preceding vehicle N1 runs off the first traveling lane DL1 by a predetermined distance. The predetermined distance may be, for example, the half of the lane width. The predetermined distance may also be a value calculated based on the simulation result of simple passing. The predetermined distance may also be a distance calculated by adding a predetermined margin to the distance measured in the test traveling of simple passing or in the actual traveling.

When the lateral position of the preceding vehicle N1 in the temporary link state is within the temporary link continuation range, the state determination unit 55 maintains the link state as the temporary link, assuming that that the preceding vehicle N1 is a vehicle that may perform simple passing (the preceding vehicle N1 may temporarily move to a position near to the lane boundary line). On the other hand, when the lateral position of the preceding vehicle N1 in the temporary link state exceeds the temporary link continuation range, the state determination unit 55 changes the link state from the temporary link to the no link, assuming that the preceding vehicle N1 is not a vehicle that will perform simple passing.

Figure 4:
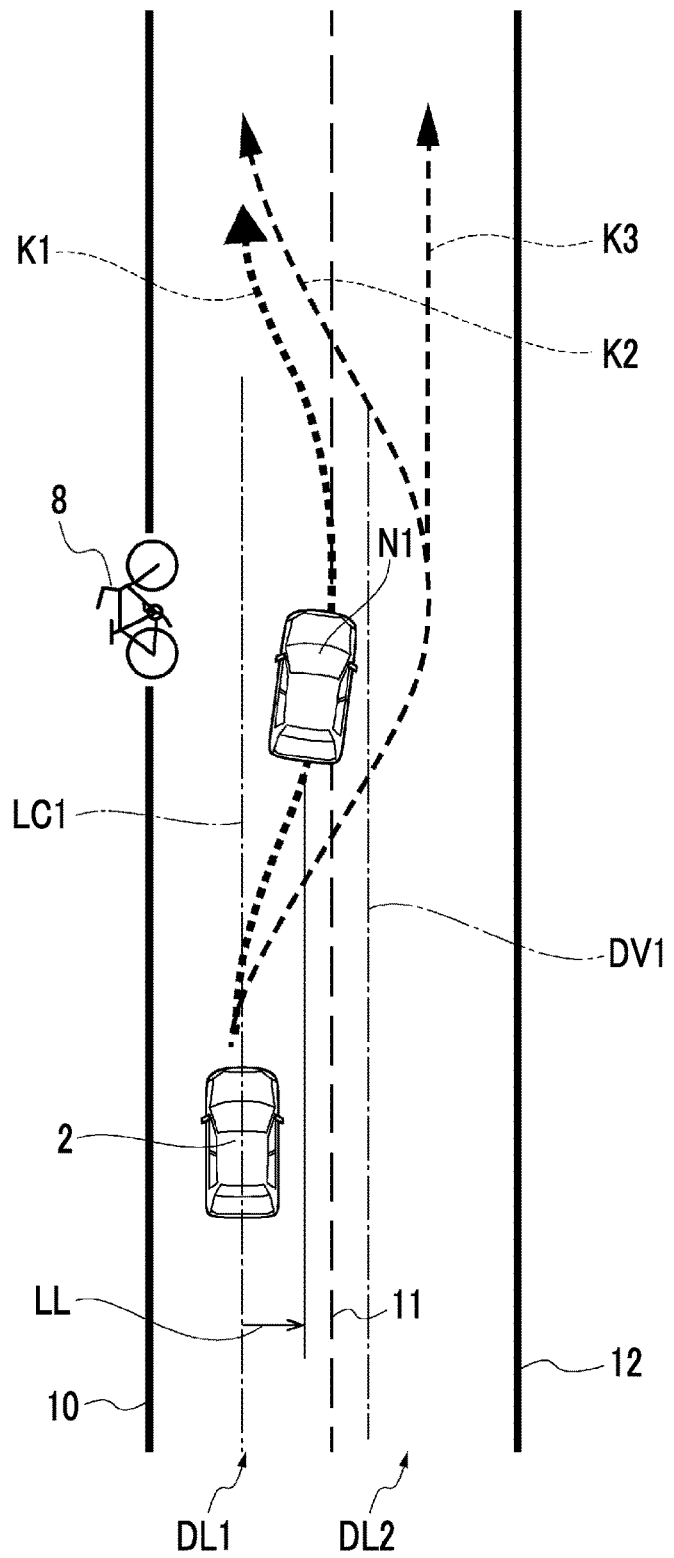
FIG. 4 is a diagram showing an example of the behavior of a preceding vehicle in a temporary link state.

FIG. 4 is a diagram showing an example of the behavior of the preceding vehicle N1 in the temporary link state. As shown in FIG. 4, when the preceding vehicle N1 begins to move in the lateral direction in the first traveling lane DL1, three behaviors are assumed as the behavior that preceding vehicle N1 will perform. The first behavior is the above-described simple passing indicated by the traveling trajectory K1. The second behavior is normal passing indicated by the traveling trajectory K2. The third behavior is a lane change indicated by the traveling trajectory K3. When performing simple passing, the preceding vehicle N1 moves within the first traveling lane DL1 or the range the preceding vehicle N1 runs off the first traveling lane DL1 by the predetermined distance. On the other hand, when performing normal passing or a lane change, the preceding vehicle N1 moves to the second traveling lane DL2.

With consideration for the behaviors described above, the state determination unit 55 defines the range partitioned by LC1, which is the lane center of the first traveling lane DL1, and the virtual boundary line DV1, which is a boundary line a predetermined distance away from the lane boundary line 11 to the outside of the first traveling lane DL1, as an example of the temporary link continuation range. By defining the temporary link continuation range in this way, the state determination unit 55 can determine that, when the preceding vehicle N1 travels along the traveling trajectory K1 (that is, when the preceding vehicle N1 performs simple passing), the link state between the vehicle 2 and the preceding vehicle N1 is the temporary link. Similarly, the state determination unit 55 can determine that, when the preceding vehicle N1 travels along the traveling trajectory K2 or K3 (that is, when the preceding vehicle N1 performs normal passing or a lane change), the link state between the vehicle 2 and the preceding vehicle N1 is the no link. The temporary link continuation range is not limited to the area described above, and may be an area that falls within the first traveling lane DL1.

To determine whether the termination condition of the temporary link is satisfied, the information on the lateral position of the preceding vehicle N1 in the temporary link state is required. However, when the link state is the temporary link, the on-vehicle sensor 4 has lost the preceding vehicle N1. For this reason, the state determination unit 55 calculates the lateral position of the preceding vehicle N1 via inter-vehicle communication. For example, the state determination unit 55 acquires the lateral position of the preceding vehicle N1 (offset LL) directly from the preceding vehicle N1 via inter-vehicle communication. For example, in some cases, the preceding vehicle N1 constantly calculates the lateral position of the preceding vehicle N1 for use in the lane departure determination or in autonomous traveling. In such a case, the state determination unit 55 can receive the lateral position of the preceding vehicle N1 (offset LL) directly from the preceding vehicle N1. In other cases, the state determination unit 55 may estimate the lateral position of the preceding vehicle N1 (offset LL) based on the information obtained via inter-vehicle communication. For example, while the vehicle 2 and the preceding vehicle N1 are in the regular link state, the state determination unit 55 constantly calculates the lateral displacement of the preceding vehicle N1 based on the lateral displacement of the vehicle 2 from the lane center LC1 and the relative position of the preceding vehicle N1 relative to the vehicle 2 detected by the on-vehicle sensor 4 (the processing performed in the first traveling section SC1 in FIG. 2). The lateral displacement of the vehicle 2 from the lane center LC1 can be acquired by a known method (such as the lane boundary line recognition processing using a camera, the matching processing with the map information). Then, when the on-vehicle sensor 4 loses the preceding vehicle N1, the state determination unit 55 estimates the lateral displacement of the preceding vehicle N1 using the communication information that will be received in future (the processing performed in the second traveling section SC2 in FIG. 2), with the initial value being the value calculated immediately before the preceding vehicle N1 was lost. For example, the state determination unit 55 acquires the data, such as the speed and the yaw rate of the preceding vehicle N1, as the communication information. Then, the state determination unit 55 integrates the acquired data, or applies a vehicle model to the acquired data, to estimates the lateral displacement of the preceding vehicle N1.

In the description below, the determination as to whether the lateral position of the preceding vehicle N1 in the temporary link state is within the temporary link continuation range is also referred to as the "first determination" in simple passing. The state determination unit 55 may turn on the temporary link continuation flag if the first determination is true. It should be noted that, even if it is determined by the first determination that the lateral position of the preceding vehicle N1 in the temporary link state is within the temporary link continuation range, the preceding vehicle N1 will not necessarily perform simple passing. Therefore, to determine more clearly whether the preceding vehicle N1 will perform simple passing, the behavior determination unit 54 determines the behavior of the preceding vehicle N1 when the lateral position of the preceding vehicle N1 in the temporary link state is within the temporary link continuation range. The determination of the behavior is to determine the behavior of the preceding vehicle N1. For example, it is determined whether the preceding vehicle N1 begins to move toward the lane center LC1 (second determination). The second determination is performed based on the displacement of the lateral position of the preceding vehicle whose the link state is the temporary link. For example, the behavior determination unit 54 keeps updating the maximum value of the lateral position of the preceding vehicle N1 from the time when the preceding vehicle N1 enters the temporary link state. If a lateral position reduction from the past maximum value of the lateral position becomes equal to or greater than the threshold value, the behavior determination unit 54 determines that the preceding vehicle N1 will return to the first traveling lane DL1 that is the original traveling lane.

Figure 5:
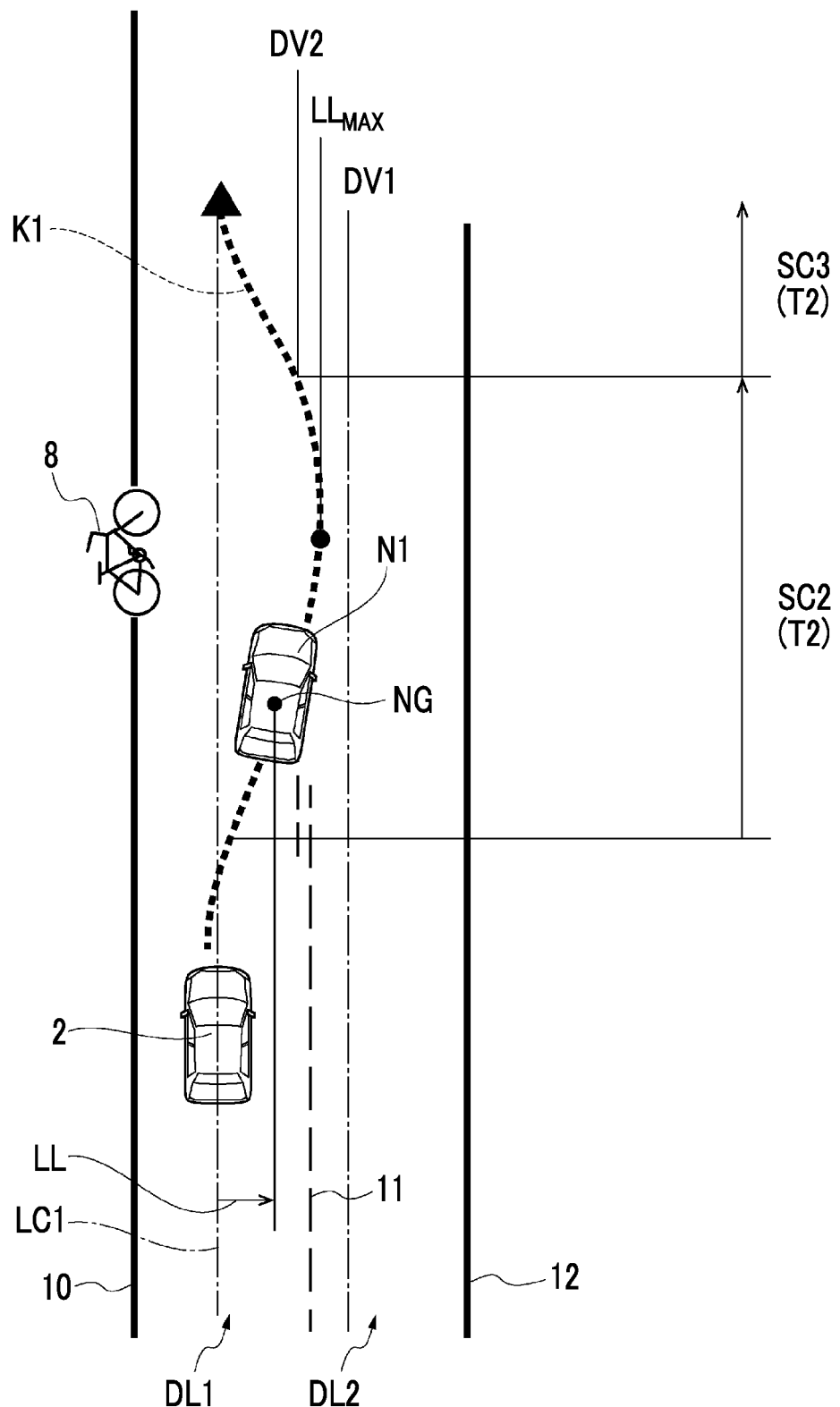
FIG. 5 is a diagram showing an example of a threshold value used for determining the behavior of a preceding vehicle in a temporary link state.

FIG. 5 is a diagram showing an example of a threshold value used for determining the behavior of the preceding vehicle in the temporary link state. As shown in FIG. 5, it is assumed, in the temporary link continuation range, that the maximum value $LL_{MAX}$ of the lateral position of the preceding vehicle N1 occurs inner than the virtual boundary line DV1 which is the boundary of the temporary link continuation range. In this case, the threshold value DV2, which is used for the second determination, is set at a position in the lane that is inner than the maximum value $LL_{MAX}$ by a predetermined distance. For example, the predetermined distance may be set as a ratio based on the maximum value $LL_{MAX}$ (for example, 80% of the maximum value $LL_{MAX}$).

As shown in FIG. 2 and FIG. 5, the section from the time the preceding vehicle N1 starts simple passing to the time the lateral position reduction, equal to or greater than the threshold value DV2, from the maximum value $LL_{MAX}$ occurs is defined as the second traveling section SC2. Similarly, the section from the time the lateral position reduction, equal to or greater than the threshold value DV2, from the maximum value $LL_{MAX}$ occurs to the time the preceding vehicle N1 is positioned at the lane center LC1 is defined as the third traveling section SC3.

If it is determined that the preceding vehicle N1 will return to the first traveling lane DL1 that is the original traveling lane, the behavior determination unit 54 turns on the return flag and resets the maximum value of the lateral position of the preceding vehicle N1 that has been stored. The first determination and the second determination can be used to determine whether the preceding vehicle N1 will perform simple passing.

When the preceding vehicle N1 whose link state is the temporary link is re-detected by the on-vehicle sensor 4, the state determination unit 55 determines that the link state between the preceding vehicle N1, re-detected by the on-vehicle sensor 4, and the vehicle 2 is the regular link. This means that, when the preceding vehicle N1 is re-detected by the on-vehicle sensor 4 during simple passing or after simple passing, the link state can be changed from the temporary link to the regular link.

The recognition unit 56 recognizes the preceding vehicle based on the link state. The recognition unit 56 recognizes the preceding vehicle N1 whose link state is the regular link as the preceding vehicle to be followed. The recognition unit 56 continuously recognizes the preceding vehicle whose the link state has been changed from the regular link to the temporary link as the preceding vehicle to be controlled as long as the link state is determined as the temporary link. As a result, even if the on-vehicle sensor 4 loses the preceding vehicle N1 that is identified based on the inter-vehicle communication and the on-vehicle sensor 4, the preceding vehicle N1 is continuously recognized as the preceding vehicle to be controlled.

Furthermore, as the termination condition of the temporary link, the state determination unit 55 may use a temporal termination condition instead of the above-described termination condition that is based on the lateral position, or may add a temporal condition to the above-described termination condition that is based on the lateral position.

The details of the temporal condition will be described below. The state determination unit 55 performs the following processing considering that simple passing will be completed within a predetermined time. The state determination unit 55 starts counting processing when the on-vehicle sensor 4 loses the preceding vehicle N1 in the regular link state and, as a result, the link state between the vehicle 2 and the preceding vehicle N1 becomes the temporary link. As the counting processing, the state determination unit 55 increments the temporary link timer as the time elapses (e.g., increments the timer every second). The termination condition of the temporary link is satisfied when the first limit time has passed since the on-vehicle sensor 4 lost the preceding vehicle N1. That is, the state determination unit 55 maintains the temporary link while the timer value of the temporary link timer is within the first limit time, and changes the link state from the temporary link to the no link when the timer value of the temporary link timer has passed the first limit time. The first limit time may be a value calculated in the simulation of simple passing. The first limit time may also be a time calculated by adding a predetermined margin to the time measured in the test traveling of simple passing or in the actual traveling. The first limit time may also be a time obtained by correcting one of the first limit times described above using the speed of the vehicle 2 or the relative speed with respect to the object that will be passed.

When adding a temporal condition to the termination condition that is based on the lateral position described above, the state determination unit 55 determines the temporary link as follows. The state determination unit 55 maintains the temporary link if the timer value of the temporary link timer is within the first limit time and if the lateral position of the preceding vehicle N1 in the temporary link state is within the temporary link continuation range. On the other hand, the state determination unit 55 changes the link state from the temporary link to the no link if the timer value of the temporary link timer exceeds the first limit time or if the lateral position of the preceding vehicle N1 in the temporary link state exceeds the temporary link continuation range. That is, the first limit time is a temporal constraint that is set for the first determination.

Furthermore, the state determination unit 55 may place restrictions on the time that will elapse until the preceding vehicle N1 whose link state is the temporary link is re-detected by the on-vehicle sensor 4. For example, if it is determined by the second determination that the preceding vehicle N1 has begun to travel toward the lane center LC1, the state determination unit 55 releases the first limit time and newly sets a second limit time. If the preceding vehicle N1 whose link state is the temporary link is re-detected by the on-vehicle sensor 4 from the time the behavior determination unit 54 determines that the preceding vehicle N1 whose link state is the temporary link has begun to travel toward the lane center LC1 to the time the second limit time elapses, the state determination unit 55 determines that the link state between the preceding vehicle N1 re-detected by the on-vehicle sensor 4 and the vehicle 2 is the regular link. On the other hand, if the preceding vehicle N1 whose link state is the temporary link is not re-detected by the on-vehicle sensor 4 until the timer value of the temporary link timer reaches the second limit time, the state determination unit 55 changes the link state from the temporary link to no link (third determination). The state determination unit 55 resets the temporary link timer when the link state is changed from the temporary link to the regular link or to the no link.

As described above, when the on-vehicle sensor 4 loses the preceding vehicle N1 in the regular link state while the inter-vehicle communication can be continued, the recognition ECU 5 sets the link state between the preceding vehicle N1, which had been in the regular link state, and the vehicle 2 to the temporary link to continue the state in which the preceding vehicle N1 is still recognized.

The following travel ECU 6, connected to the network that communicates using the CAN communication circuit, is connected to the above-described components of the vehicle 2 so that it can communicate with those components. For example, the following travel ECU 6 operates the CAN communication circuit to send/receive data based on the signal output by the CPU, stores the received data in the RAM, loads the program stored in the ROM to the RAM, and executes the program loaded in the RAM to implement the function of the components of the following travel ECU 6 that will be described later. The following travel ECU 6 may be configured by a plurality of electronic control units.

The following travel ECU 6 controls the vehicle 2 so that the preceding vehicle N1 recognized by the recognition ECU 5 can be followed. For example, the following travel ECU 6 controls the engine actuator, the brake actuator, and the steering actuator of the vehicle 2 so that a predetermined inter-vehicle distance between the vehicle 2 and the preceding vehicle N1 can be maintained. A known technique may be used for the preceding-vehicle following control.

[Operation of Vehicle Recognition Device]

Figure 6:
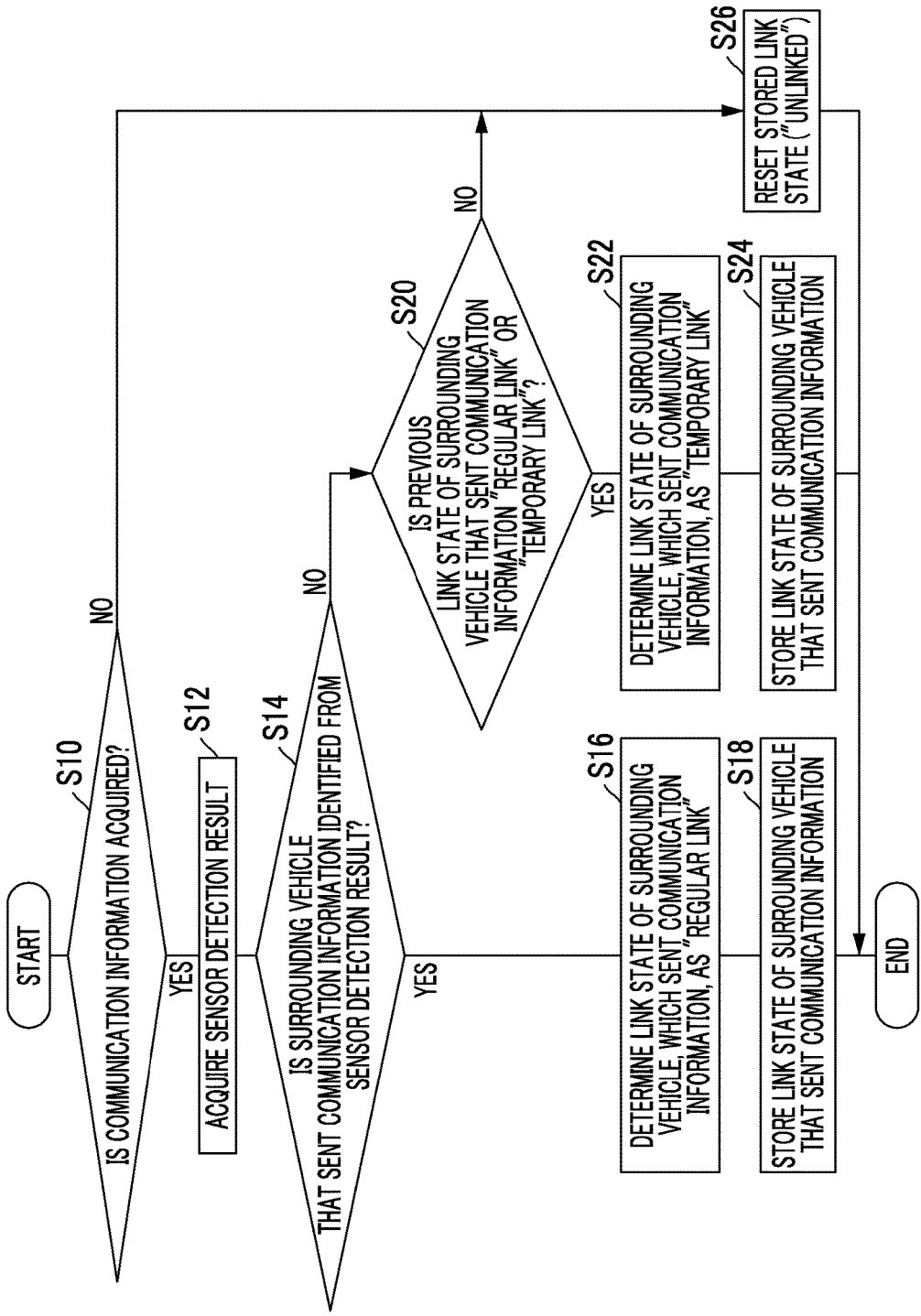
FIG. 6 is a flowchart showing an example of the link determination processing.

Next, the flow of a series of vehicle recognition processing performed by the vehicle recognition device 1 will be described. FIG. 6 is a flowchart showing an example of the link determination processing. The flowchart shown in FIG. 6 is started when the control processing which requires recognizing a control target is started (in this case, the preceding-vehicle following control processing).

The communication unit 51 of the vehicle recognition device 1 performs the communication information acquisition determination processing (S10). First the communication unit 51 acquires the communication information, which includes the traveling state of surrounding vehicles, from the surrounding vehicles via inter-vehicle communication. The communication unit 51 acquires the position and the speed of the surrounding vehicles, for example, as shown in FIG. 3. Next, the communication unit 51 determines whether the communication information is acquired.

If it is determined that the communication information is acquired (S10: YES), the acquisition unit 52 of the vehicle recognition device 1 performs the acquisition processing (S12) of the sensor detection result to acquire the detection result of the traveling state of the preceding vehicle N1 from the on-vehicle sensor 4 of the vehicle 2. For example, the acquisition unit 52 acquires the position and the speed of the preceding vehicle N1 as shown in FIG. 3. The acquisition processing (S12) and the acquisition processing (S10) can be executed in any order.

Next, the vehicle identification unit 53 of the vehicle recognition device 1 performs the identification processing (S14). The vehicle identification unit 53 compares the traveling state, included in the communication information acquired by the communication information acquisition processing (S10), and the detection result of the traveling state, acquired by the sensor detection result acquisition processing (S12), for identifying the surrounding vehicle (in this case, the preceding vehicle N1) that sent the communication information. For example, as shown in FIG. 3, the vehicle identification unit 53 identifies a vehicle as the preceding vehicle N1 that sent the communication information if a match occurs between the position and speed included in the traveling state in the communication information and the position and speed included in the traveling state in the sensor detection result.

If the preceding vehicle N1 that sent the communication information is identified (S14: YES) in the identification processing (S14), the state determination unit 55 performs the state determination processing (S16) to determine that the link state between the identified preceding vehicle N1 and the vehicle 2 is the regular link. Then, the state determination unit 55 performs the storage processing (S18) to store that the link state between the preceding vehicle N1 and the vehicle 2 is the regular link. The state determination unit 55 updates the link state stored in the table shown, for example, in FIG. 3. When the storage processing (S18) is terminated, the link determination processing is terminated.

If the preceding vehicle N1 that sent the communication information is not identified in the identification processing (S14), the state determination unit 55 performs the previous link state determination processing (S20) to determine whether the previous link state of the preceding vehicle N1, which sent the communication information, is the "regular link" or the "temporary link". If the previous link state of the preceding vehicle N1 that sent the communication information is the "regular link" or the "temporary link" (S20: YES), the state determination unit 55 performs the state determination processing (S22) to determine the link state between the preceding vehicle N1 and the vehicle 2 as the temporary link. Then, the state determination unit 55 performs the storage processing (S24) to store that the link state between the preceding vehicle N1 and the vehicle 2 is the temporary link. The state determination unit 55 updates the link state stored in the table shown, for example, in FIG. 3. When the storage processing (S24) is terminated, the link determination processing is terminated.

If it is determined by the communication information acquisition determination processing (S10) that communication information is not acquired (S10: NO), or if it is determined by the previous link state determination processing (S20) that the previous link state of the preceding vehicle N1 is not "regular link" or "temporary link", that is, if the previous link state is "no link" (S20: NO), the state determination unit 55 performs the reset processing (S26) to reset the stored link state. The state determination unit 55 sets all the link states in the table shown, for example, in FIG. 3 to the unlinked state. When the reset processing is terminated (S26), the link determination processing is terminated.

After the processing described above is completed, the flowchart shown in FIG. 6 is terminated. After the termination, the flowchart shown in FIG. 6 is executed from the beginning until preceding-vehicle N1 following control processing is terminated. In this way, the link determination processing shown in FIG. 6 dynamically updates the link state between the vehicle 2 and the preceding vehicle N1.

Figure 7:
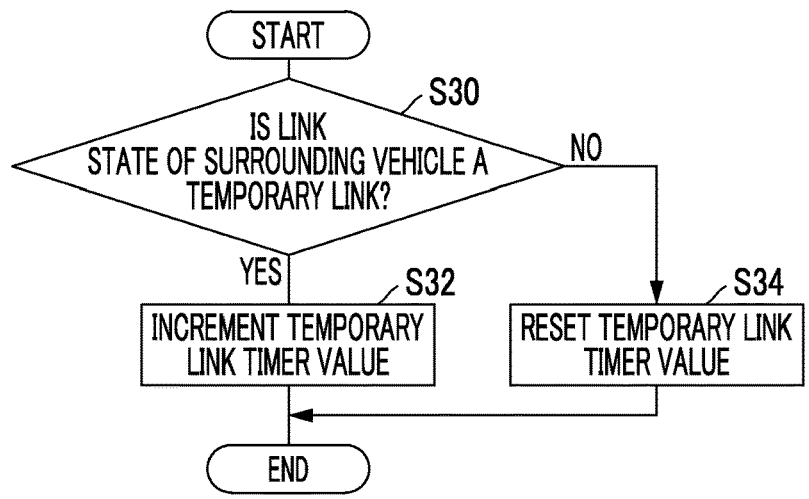
FIG. 7 is a flowchart showing an example of the counting processing of a temporary link timer value.

Next, the counting processing of the temporary link timer value will be described. FIG. 7 is a flowchart showing an example of the counting processing of the temporary link timer value. The flowchart shown in FIG. 7 is started when the control processing which requires recognizing a control target is started (in this case, the preceding-vehicle following control processing).

First, the state determination unit 55 of the vehicle recognition device 1 performs the temporary link determination processing (S30) to determine whether the link state of a surrounding vehicle (in this case, the preceding vehicle N1) is the temporary link. If it is determined by the temporary link determination processing (S30) that the link state of the preceding vehicle N1 is the temporary link (S30: YES), the state determination unit 55 performs the count-up processing (S32) to increment the temporary link timer value (S32). On the other hand, if it is determined by the temporary link determination processing (S30) that the link state of the preceding vehicle N1 is not the temporary link (S30: NO), the state determination unit 55 performs the timer reset processing (S34) to reset the temporary link timer value.

When the count-up processing (S32) or the timer reset processing (S34) is terminated, the counting processing shown in FIG. 7 is terminated. After the termination, the flowchart shown in FIG. 7 is executed from the beginning until the preceding-vehicle N1 following control processing is terminated. The counting processing counts the time during which the temporary link is continued.

Figure 8:
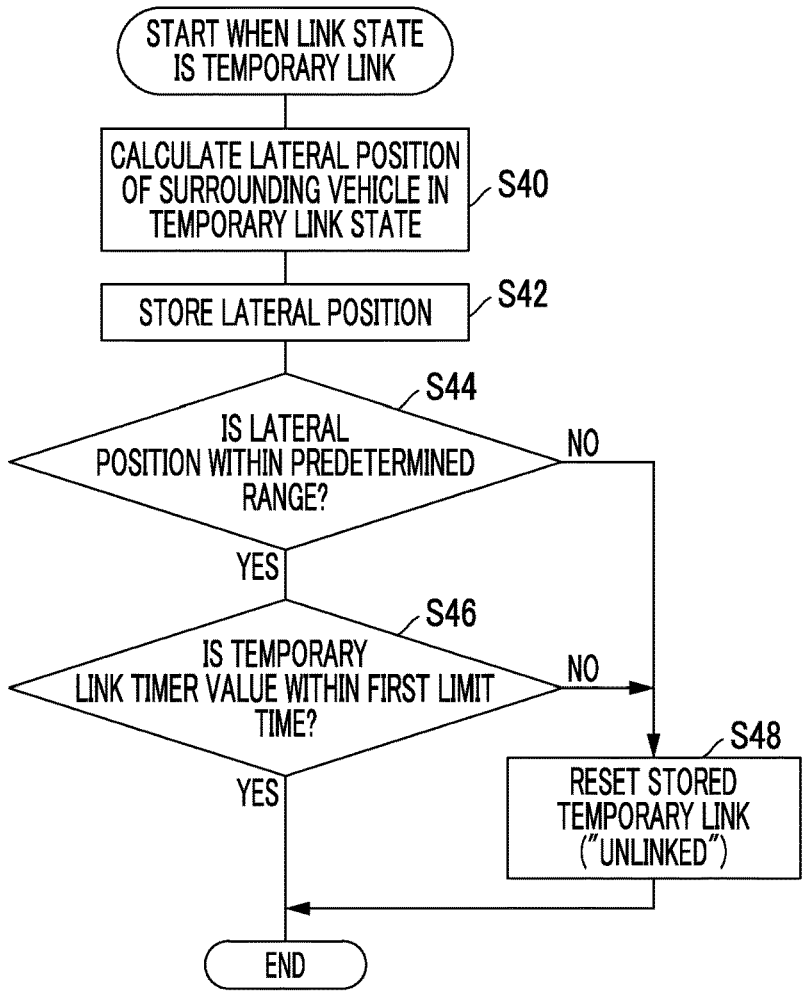
FIG. 8 is a flowchart showing an example of the termination processing of a temporary link (first determination processing)

Next, the temporary link termination processing according to the first determination will be described. FIG. 8 is a flowchart showing an example of the temporary link termination processing (first determination processing). The flowchart shown in FIG. 8 is executed when the link state between the preceding vehicle N1 and the vehicle 2 is determined as the temporary link in the state determination processing (S22) shown in FIG. 6.

First, the state determination unit 55 of the vehicle recognition device 1 performs the lateral position calculation processing (S40) to calculate the lateral position of the surrounding vehicle (in this case, the preceding vehicle N1). The state determination unit 55 calculates the lateral position of the preceding vehicle N1 based on the information obtained via inter-vehicle communication. After that, the state determination unit 55 performs the storage processing (S42) to store the lateral position of the preceding vehicle N1.

After that, the state determination unit 55 performs the determination processing (S44) to determine whether the lateral position of the preceding vehicle N1 is within the temporary link continuation range (an example of the predetermined range). If it is determined by the determination processing (S44) that the lateral position of the preceding vehicle N1 is within the temporary link continuation range (S44: YES), the state determination unit 55 turns on the temporary link continuation flag and performs the timer confirmation processing (S46) to determine whether the temporary link timer value is within the first limit time. If it is determined by the timer confirmation processing (S46) that the temporary link timer value is within the first limit time (S46: YES), the state determination unit 55 terminates the flowchart shown in FIG. 8 with the preceding vehicle N1 remaining in the temporary link state. Since the temporary link is continued, the state determination unit 55 executes the flowchart shown in FIG. 8 from the beginning.

If it is determined by the determination processing (S44) that the lateral position of the preceding vehicle N1 is not within the temporary link continuation range (S44: NO) or if it is determined by the timer confirmation processing (S46) that the temporary link timer value is not within the first limit time (S46: NO), the state determination unit 55 performs the timer reset processing (S48) to reset the temporary link timer value. The temporary link continuation flag, if ON, is set to OFF. Since the temporary link is not continued, the state determination unit 55 does not execute the flowchart shown in FIG. 8 from the beginning.

As described above, the state determination unit 55 maintains the temporary link if the first determination is satisfied within the first limit time.

Figure 9:
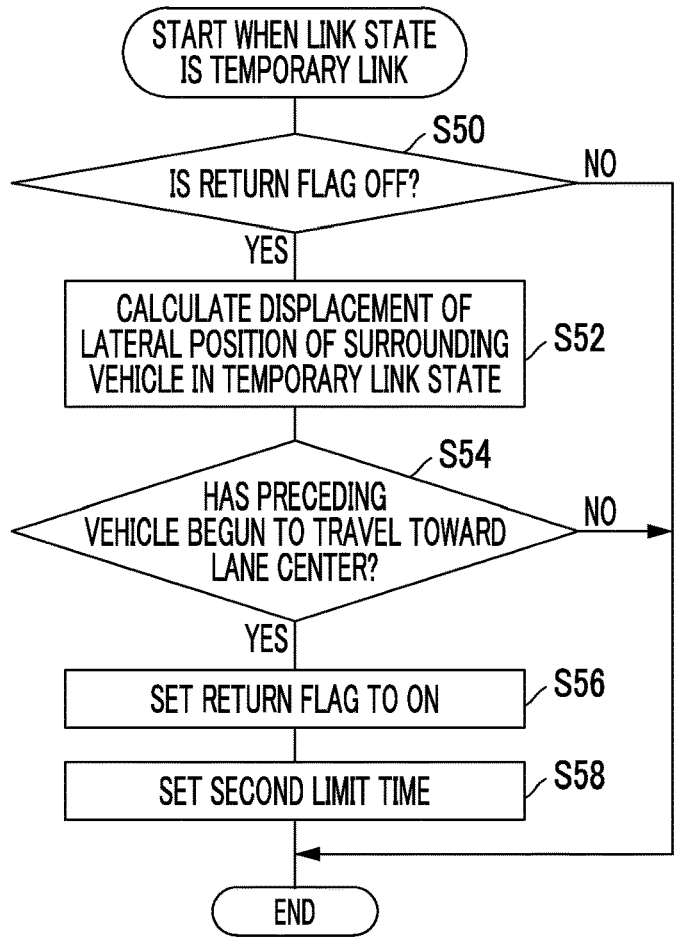
FIG. 9 is a flowchart showing an example of the second determination processing.

Next, the second determination processing will be described. FIG. 9 is a flowchart showing an example of the second determination processing. The flowchart shown in FIG. 9 is executed when the link state between the preceding vehicle N1 and the vehicle 2 is determined as the temporary link in the state determination processing (S22), shown in FIG. 6.

First, the state determination unit 55 of the vehicle recognition device 1 performs the return flag determination processing (S50) to determine whether the return flag is OFF. If it is determined by the determination processing (S50) that the return flag is OFF (S50: YES), the state determination unit 55 performs the displacement calculation processing (S52) to calculate the displacement of the lateral position of the surrounding vehicle in the temporary link state (in this case, the preceding vehicle N1). The state determination unit 55 references the lateral position, calculated and stored by the lateral position calculation processing (S40) and storage processing (S42) both of which are shown in FIG. 8, and calculates the displacement by comparing the maximum value of the lateral position up to the previous time and the current lateral position.

After that, the state determination unit 55 performs the return determination processing (S54) to determine whether the preceding vehicle N1 has begun to travel toward the lane center LC1. The state determination unit 55 determines whether a lateral position reduction, equal to or greater than the threshold, from the past maximum value has occurred, based on the result of the displacement calculation processing (S52). If a lateral position reduction, equal to or greater than the threshold, from the past maximum value has occurred, the state determination unit 55 determines that the preceding vehicle N1 has begun to travel toward the lane center LC1. If a lateral position reduction, equal to or greater than the threshold, from the past maximum value has not occurred, the state determination unit 55 determines that the preceding vehicle N1 has not begun to travel toward the lane center LC1.

If it is determined by the return determination processing (S54) that the preceding vehicle N1 has begun to travel toward the lane center LC1 (S54: YES), the state determination unit 55 performs the return flag setting processing (S56) to set the return flag to ON. After that, the state determination unit 55 performs the limit time setting processing (S58) to release the first limit time and newly sets the second limit time.

The second determination processing is terminated when the limit time setting processing (S58) is terminated, or is terminated if it is not determined by the determination processing (S50) that the return flag is OFF (S50: NO) or if it is not determined by the return determination processing (S54) that the preceding vehicle N1 has begun to travel toward the lane center LC1 (S54: NO). While the temporary link state is continued, the state determination unit 55 executes the flowchart shown in FIG. 9 from the beginning.

As described above, if it is determined that the preceding vehicle N1 performs simple passing, the state determination unit 55 sets the second limit time.

Figure 10:
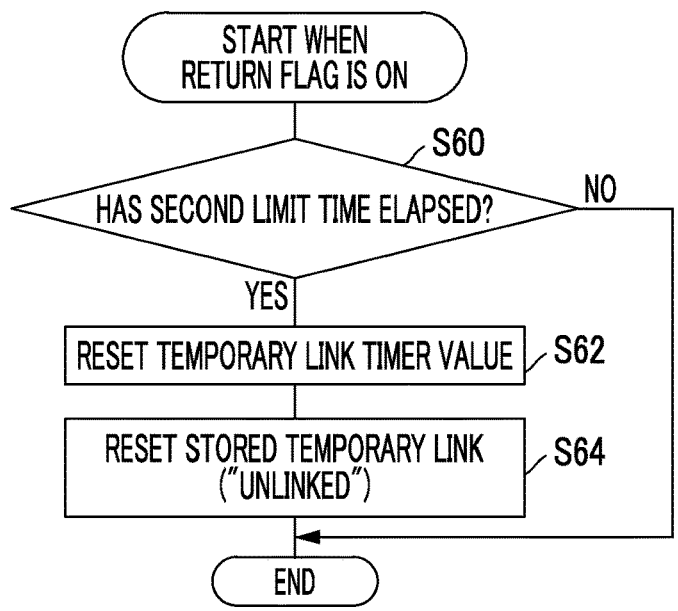
FIG. 10 is a flowchart showing an example of the termination processing of a temporary link (third determination processing)

Next, the temporary link termination processing according to the third determination will be described. FIG. 10 is a flowchart showing an example of the temporary link termination processing (third determination processing). The flowchart shown in FIG. 10 is executed when the return flag is set to ON by the return flag setting processing (S56) shown in FIG. 9.

First, the state determination unit 55 of the vehicle recognition device 1 performs the timer confirmation processing (S60) to determine whether the temporary link timer value has reached the second limit time. If it is determined by the timer confirmation processing (S60) that the temporary link timer value has reached the second limit time (S60: YES), the state determination unit 55 performs the timer reset processing (S62) to reset the temporary link timer value. After that, the state determination unit 55 performs the reset processing (S64) to reset the temporary link that is stored. The state determination unit 55 sets the link state of the preceding vehicle N1 stored in the table shown, for example, in FIG. 3 to the unlinked state.

If it is not determined by the timer confirmation processing (S60) that the temporary link timer value has reached the second limit time (S60: NO) or if the reset processing (S64) is ended, the third determination process is terminated.

Thus, the temporary link is reset when the second limit time elapses. Except when the link state is changed from the temporary link to the regular link by the state determination processing (S16) in the link determination processing shown in FIG. 6 before the second limit time elapses or when the link state is changed from the temporary link to the unlinked state by the reset processing (S26) in the link determination processing shown in FIG. 6 before the second limit time elapses, the temporary link is reset when the second limit time elapses.

Figure 11:
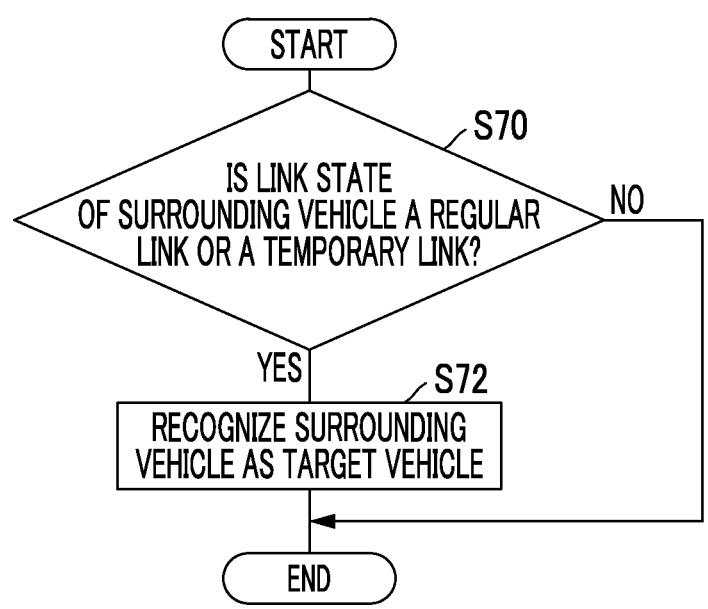
FIG. 11 is a flowchart showing an example of the recognition processing.

Next, the recognition processing will be described. FIG. 11 is a flowchart showing an example of the recognition processing. The flowchart shown in FIG. 11 is started when the control processing which requires recognizing a control target is started (in this case, the preceding-vehicle following control processing).

First, the recognition unit 56 performs the determination processing (S70) to determine whether the link state of the surrounding vehicle (in this case, the preceding vehicle N1) is either the regular link or the temporary link. If it is determined by the determination processing (S70) that the link state of the surrounding vehicle (in this case, the preceding vehicle N1) is either the regular link or the temporary link, the recognition unit 56 performs the target recognition processing (S72) to recognize the preceding vehicle N1 as the target vehicle.

If it is not determined by the determination processing (S70) that the link state of the surrounding vehicle (in this case, the preceding vehicle N1) is either the regular link or the temporary link or when the target recognition processing (S72) is terminated, the recognition processing is terminated. After the termination, the flowchart shown in FIG. 11 is executed from the beginning until preceding-vehicle N1 following control processing is terminated. By performing the recognition processing, the preceding vehicle, if in the temporary link state, is recognized as the target vehicle.

[Summary of Vehicle Recognition Device Operation]

Figure 12:
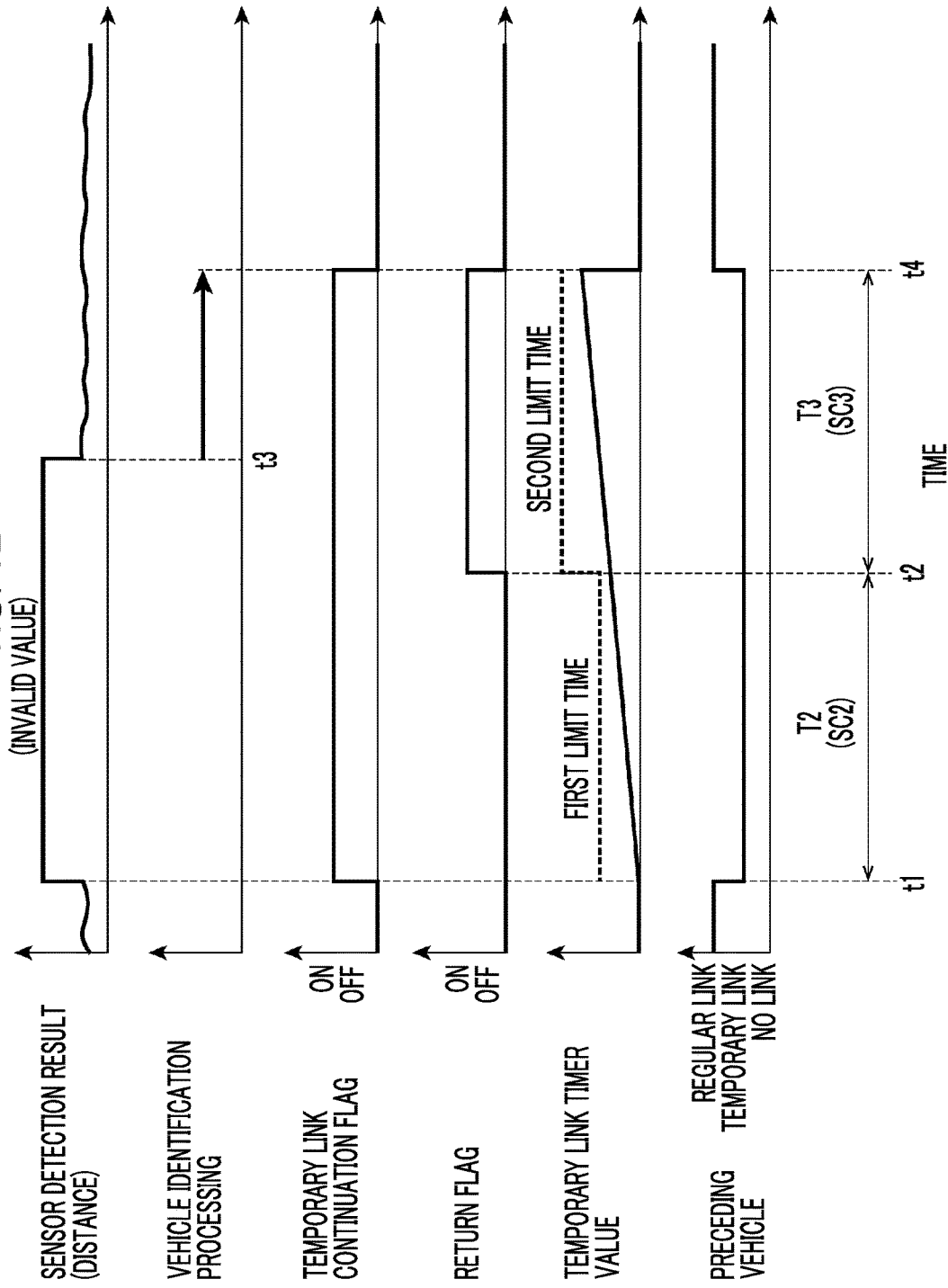
FIG. 12 is a diagram showing an example of a timing chart of a series of processing of a vehicle recognition device.
Figure 13:
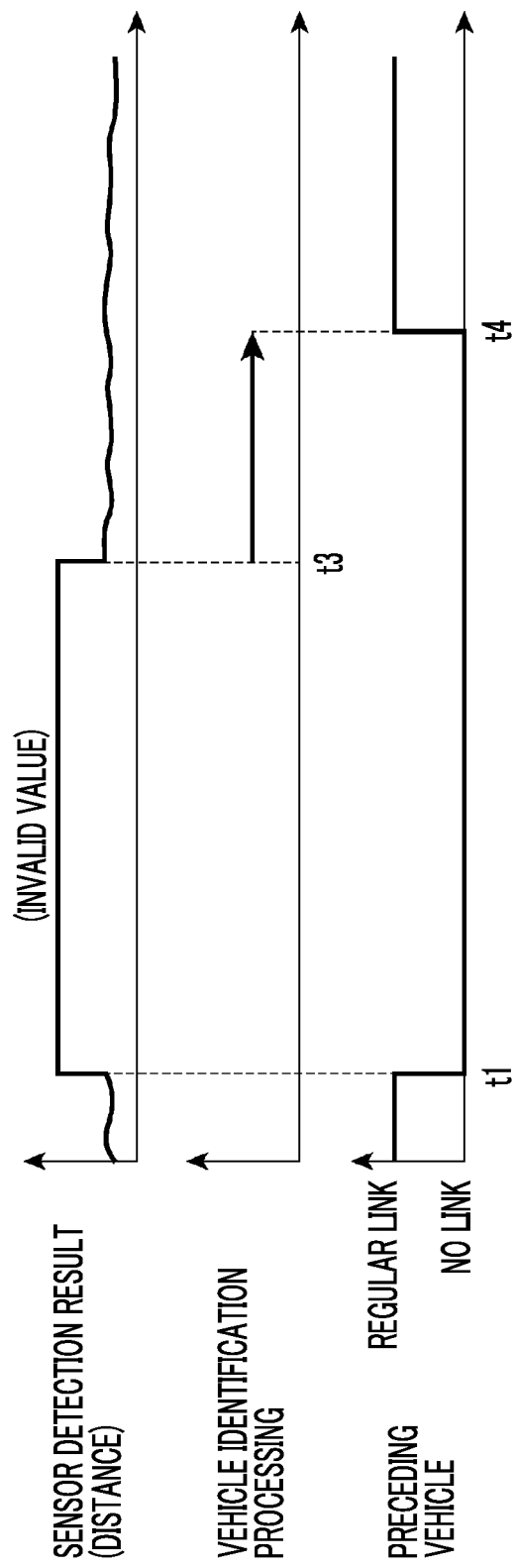
FIG. 13 is a diagram showing an example of a timing chart of a series of processing of a conventional device.

FIG. 12 is a diagram showing an example of the timing chart of a series of processing of the vehicle recognition device 1. FIG. 13 is a diagram showing an example of the timing chart of a series of processing of a conventional device. Both FIG. 12 and FIG. 13 show the processing for recognizing the preceding vehicle N1 that performs simple passing. More specifically, the preceding vehicle N1, which is traveling along the lane center LC1 in the first traveling lane DL1 shown in FIG. 2, begins to move in the lateral direction at time t1 in order to perform simple passing. Then, it is assumed that the preceding vehicle N1 begins to move toward the lane center LC1 in the first traveling lane DL1 at time t2 and, after avoiding an object 8 that is present on the shoulder, reaches a position near to the lane center LC1 in the first traveling lane DL1 at time t3. An example of recognizing the preceding vehicle N1 that performs such a movement will be described. It is assumed that inter-vehicle communication with the preceding vehicle N1 is constantly continued.

For the sake of comparison, a series of processing of the conventional device will be described first. In the graph shown in FIG. 13, the horizontal axis represents the time, and the three vertical axes represent, over time, the sensor detection result of the preceding vehicle N1 (for example, the distance detection value), whether or not the vehicle identification processing is performed, and the link state (regular link, no link) of the preceding vehicle, respectively. When the preceding vehicle N1 is traveling along the lane center LC1 in the first traveling lane DL1, the on-vehicle sensor 4 detects the preceding vehicle N1 as shown in the graph (sensor detection result) at the top of FIG. 13 and its link state becomes the regular link as shown in the graph (preceding vehicle link state) at the bottom of FIG. 13. After that, when the preceding vehicle N1 begins to move in the lateral direction at time t1, the on-vehicle sensor 4 loses the preceding vehicle N1. This state, in which the preceding vehicle N1 is lost, continues until time t3 at which the preceding vehicle N1 reaches a position near to the lane center LC1 in the first traveling lane DL1. In this case, the link state becomes the no link state from time t1 at which the state in which the preceding vehicle N1 is lost is started. Furthermore, even if the on-vehicle sensor 4 re-detects the preceding vehicle N1 at time t3, it is necessary to perform the vehicle identification processing as shown in the graph in the middle of FIG. 13. As a result, the link state returns from the no link to the regular link at time t4 at which the vehicle identification processing is completed. As described above, since the preceding vehicle N1 is lost from time t1 to time t4, the conventional device cannot perform the preceding-vehicle following processing from time t1 to time t4.

On the other hand, the vehicle recognition device 1 introduces the concept of the "temporary link", in which the "identification of a vehicle" is not equivalent to the "recognition of the vehicle" and, even if the vehicle is not identified, the "recognition of the vehicle" is continued. In the graph shown in FIG. 12, the horizontal axis represents the time, and the six vertical axes represent, over time, the sensor detection result of the preceding vehicle N1 (for example, the distance detection value), whether or not the vehicle identification processing is performed, the state of the temporary link continuation flag, the state of the return flag, the temporary link timer value, and the link state of the preceding vehicle (regular link, temporary link, no link). The first graph to the sixth graph are shown in order from the top.

The first graph (sensor detection result) and the second graph (vehicle identification processing) in FIG. 12 are the same as those in FIG. 13. That is, the timing in which the on-vehicle sensor 4 is lost and the time and timing required for the vehicle identification processing are the same as those of the conventional device.

As shown in the sixth graph (preceding vehicle link state) in FIG. 12, the link state between the vehicle 2 and the preceding vehicle N1 is changed from the regular link to the temporary link at time t1 at which the on-vehicle sensor 4 loses the preceding vehicle N1. At this time, as shown in the third graph (temporary link continuation flag) in FIG. 12, the temporary link continuation flag is turned on from time t1 at which the on-vehicle sensor 4 is lost (first determination). The temporary link continuation flag remains ON as long as the lateral position of the preceding vehicle N1 is within the temporary link continuation range. In addition, as shown in the fifth graph (temporary link timer value) in FIG. 12, the counting processing of the temporary link timer value is started from time t1 at which the on-vehicle sensor 4 loses the preceding vehicle N1. At time t1, the temporary link timer value is set to the first limit time.

As shown in the fourth graph (return flag) in FIG. 12, the return flag is turned ON at time t2 at which the preceding vehicle N1 begins to move toward the lane center LC1 of the first traveling lane DL1 (second determination). As shown in the fifth graph (temporary link timer value) in FIG. 12, the first limit time is released and the temporary link timer value is set to the second limit time at time t2. As shown in the sixth graph (preceding vehicle link state) in FIG. 12, the temporary link is continued for the period of time T2 from time t1 to time t2. The period of time T2 from time t1 to time t2 corresponds to the second traveling section SC2 shown in FIG. 2.

After that, the preceding vehicle N1 reaches a position near to the lane center LC1 in the first traveling lane DL1 at time t3. At time t3, the on-vehicle sensor 4 re-detects the preceding vehicle N1 and, at the same time, the vehicle identification processing is started. Then, at the time t4, the preceding vehicle N1 is identified again. At time t4, the temporary link continuation flag and the return flag are turned OFF, and the temporary link timer value is also reset. As shown in the sixth graph (preceding vehicle link state) in FIG. 12, the temporary link is continued also during the period of time T3 from time t2 to time t4. When the link state is the temporary link, the recognition unit 56 recognizes the preceding vehicle N1 as the control target vehicle. Therefore, it is possible to continue the preceding-vehicle following processing also in the period of time t1 to time t4.

As described above, according to the vehicle recognition device 1 in this embodiment, the state determination unit 55 determines the link state between the preceding vehicle N1 that sent the communication information and the vehicle 2 as the regular link. In addition, the recognition unit 56 recognizes the preceding vehicle N1 in the regular link state as the preceding vehicle to be followed. On the other hand, when the on-vehicle sensor 4 loses the preceding vehicle N1, the state determination unit 55 determines that the link state between the preceding vehicle N1 and the vehicle 2 is the temporary link from the time the on-vehicle sensor 4 loses the preceding vehicle N1 to the time the predetermined termination condition is satisfied. In addition, the recognition unit 56 continuously recognizes the preceding vehicle N1 in the temporary link state as the preceding vehicle to be followed. In this way, by providing the temporary link as one of the link states between the preceding vehicle N1 and the vehicle 2, this device can continuously recognize the preceding vehicle N1 as the preceding vehicle to be followed until the predetermined termination condition is satisfied even if the on-vehicle sensor 4 loses the preceding vehicle N1 that has been recognized as the preceding vehicle to be followed.

The vehicle recognition device 1 according to the present embodiment terminates the temporary link when the lateral position of the preceding vehicle N1, whose link state is no longer the regular link, exceeds the predetermined range, thus excluding a vehicle, such as a vehicle that is going to change the lane, from preceding vehicles to be followed.

The vehicle recognition device 1 according to the present embodiment terminates the temporary link when the first limit time has elapsed since the on-vehicle sensor 4 lost the preceding vehicle N1, thus excluding a vehicle, such as a vehicle that is going to change the lane, from preceding vehicles to be followed.

The vehicle recognition device 1 according to the present embodiment releases the predetermined termination condition for terminating the recognition of the target vehicle by changing the link state between the vehicle 2 and the preceding vehicle N1 from the temporary link to the regular link.

When the on-vehicle sensor 4 re-detects the preceding vehicle N1 in the temporary link state within the second limit time, the vehicle recognition device 1 according to the present embodiment can continuously recognize the preceding vehicle N1 that has temporarily moved to a position near to the lane boundary line by changing the link state between the vehicle 2 and the preceding vehicle N1 from the temporary link to the regular link.

The above-described embodiments can be implemented in various forms in which various changes and improvements are made based on knowledge of those skilled in the art.

Although the vehicle recognition device 1 described above recognizes the target vehicle that is a preceding vehicle to be followed, the present disclosure is not limited thereto. When used in the vehicle group forming processing as described above, the vehicle recognition device 1 assumes that a vehicle forming the vehicle group with the vehicle 2 is the target vehicle. The vehicle recognition device 1 sends the recognition information on the target vehicle to the device that performs the vehicle group forming processing. By performing the vehicle group forming processing in this way, the vehicle group can be maintained without losing a vehicle that have performed simple passing (including the following vehicle) also in the group forming processing. Similarly, when used in the signal control processing as described above, the vehicle recognition device 1 assumes that a vehicle traveling in the same signal cycle as the vehicle 2 is the target vehicle. The vehicle recognition device 1 sends the recognition information on the target vehicle to the device that performs the signal control processing. By performing the signal control processing in this way, the vehicles of the vehicle group can pass through a predetermined position where a traffic light is installed while the traffic light is green without losing a vehicle that have performed simple passing (including the following vehicle) also in the signal control processing.

What is claimed is:
1. A vehicle control device comprising:
   at least one electronic control unit configured to
      acquire communication information from a surrounding vehicle presenting around a host vehicle via inter-vehicle communication, the communication information including a traveling state of the surrounding vehicle, acquire a detection result of the traveling state of the surrounding vehicle from a sensor mounted on the host vehicle, identify the surrounding vehicle as a particular vehicle by comparing the traveling state included in the communication information and the detection result of the traveling state, the surrounding vehicle having sent the communication information, determine a link state between the surrounding vehicle and the host vehicle as a regular link while the surrounding vehicle is identified as the particular vehicle, identify the particular vehicle as a target vehicle, determine the link state between a lost vehicle and the host vehicle as a temporary link, from a time at which the sensor detects a start of a lost state to a time at which a predetermined termination condition is satisfied, the lost state being a state in which the target vehicle is no longer detected by the sensor, the lost vehicle being a vehicle the link state of which is no longer the regular link because of the lost state, continuously recognize the lost vehicle, the link state of which has been changed from the regular link to the temporary link, as the target vehicle while the link state is the temporary link, and control traveling of the host vehicle based on a traveling state of the target vehicle, wherein when the lost vehicle is re-detected by the sensor, determine the link state between the lost vehicle re-detected by the sensor and the host vehicle as the regular link.

2. The vehicle control device according to claim 1, wherein the predetermined termination condition is satisfied when a lateral position of the lost vehicle exceeds a predetermined range in a width direction of the host vehicle.

3. The vehicle control device according to claim 1, wherein the predetermined termination condition is satisfied when a predetermined first limit time has elapsed since the start of the lost state of the sensor.

4. A vehicle control device comprising:

at least one electronic control unit configured to acquire communication information from a surrounding vehicle presenting around a host vehicle via inter-vehicle communication, the communication information including a traveling state of the surrounding vehicle, acquire a detection result of the traveling state of the surrounding vehicle from a sensor mounted on the host vehicle, identify the surrounding vehicle as a particular vehicle by comparing the traveling state included in the communication information and the detection result of the traveling state, the surrounding vehicle having sent the communication information, determine a link state between the surrounding vehicle and the host vehicle as a regular link while the surrounding vehicle is identified as the particular vehicle, identify the particular vehicle as a target vehicle, determine the link state between a lost vehicle and the host vehicle as a temporary link, from a time at which the sensor detects a start of a lost state to a time at which a predetermined termination condition is satisfied, the lost vehicle being a vehicle the link state of which is no longer the regular link because of the lost state, the lost state being a state in which the target vehicle is not detected by the sensor, continuously recognize the lost vehicle the link state of which has been changed from the regular link to the temporary link as the target vehicle while the link state is the temporary link, and control traveling of the host vehicle based on a traveling state of the target vehicle, wherein the predetermined termination condition is satisfied when a lateral position of the lost vehicle exceeds a predetermined range in a width direction of the host vehicle, wherein the surrounding vehicle travels ahead of or behind the host vehicle in a lane in which the host vehicle travels, and the at least one electronic control unit is configured to determine whether the lost vehicle has begun to travel toward a center of the lane center based on a change in the lateral position of the lost vehicle and determine, when the lost vehicle is re-detected by the sensor from a time at which the at least one electronic control unit determines that the lost vehicle has begun to travel toward the center of the lane to a time at which a predetermined second limit time elapses, the link state between the lost vehicle re-detected by the sensor and the host vehicle as the regular link.

5. The vehicle control device according to claim 1, wherein the traveling state of the surrounding vehicle includes at least one of a speed of the surrounding vehicle and a position of the surrounding vehicle.

6. The vehicle control device according to claim 1, wherein when the host vehicle has the temporary link with the surrounding vehicle, the traveling state of the surrounding vehicle is acquired by the host vehicle from the surrounding vehicle via the inter-vehicle communication and the surrounding vehicle is not detected by the sensor, and when the host vehicle has the regular link with the surrounding vehicle, the traveling state of the surrounding vehicle is acquired by the host vehicle from the surrounding vehicle via the inter-vehicle communication and the surrounding vehicle is detected by the sensor.

* * * * *